United States Patent
Hu et al.

(10) Patent No.: US 10,795,443 B2
(45) Date of Patent: Oct. 6, 2020

(54) METHODS AND APPARATUS FOR DRIVING A TRANSDUCER

(71) Applicant: Cirrus Logic International Semiconductor Ltd., Edinburgh (GB)

(72) Inventors: Rong Hu, Austin, TX (US); Jie Su, Austin, TX (US)

(73) Assignee: Cirrus Logic, Inc., Austin, TX (US)

(*) Notice: Subject to any disclaimer, the term of this patent is extended or adjusted under 35 U.S.C. 154(b) by 0 days.

(21) Appl. No.: 16/207,547

(22) Filed: Dec. 3, 2018

(65) Prior Publication Data

US 2019/0294247 A1    Sep. 26, 2019

Related U.S. Application Data

(60) Provisional application No. 62/647,003, filed on Mar. 23, 2018.

(51) Int. Cl.
*H04B 3/36*     (2006.01)
*G06F 3/01*     (2006.01)
(Continued)

(52) U.S. Cl.
CPC ............ *G06F 3/016* (2013.01); *B06B 1/0207* (2013.01); *B06B 1/0261* (2013.01);
(Continued)

(58) Field of Classification Search
CPC ..... G06F 3/016; B06B 1/0207; B06B 1/0261; B06B 1/0688; H02N 2/00
See application file for complete search history.

(56) References Cited

U.S. PATENT DOCUMENTS 5,748,578 A    5/1998  Schell
5,857,986 A    1/1999  Moriyasu
(Continued)

FOREIGN PATENT DOCUMENTS

AU    2002347829       4/2003
CN    103165328 A      6/2013
(Continued)

OTHER PUBLICATIONS

International Search Report and Written Opinion of the International Searching Authority, International Application No. PCT/GB2019/050772, dated Jul. 5, 2019.
(Continued)

*Primary Examiner* — Phung Nguyen
(74) *Attorney, Agent, or Firm* — Jackson Walker L.L.P.

(57) ABSTRACT

Embodiments described herein relate to methods and apparatus for driving a haptic transducer with a driving signal. The method comprises estimating, based on a current through the haptic transducer and a terminal voltage across the haptic transducer, a back electromotive force, EMF, voltage representative of a velocity of a mass in the haptic transducer; comparing a phase of a voltage signal derived from the terminal voltage with a phase of the estimated back EMF voltage; and based on the comparison, adjusting a frequency or a phase of an output signal, wherein the driving signal is derived from the output signal, such that a frequency of the driving signal converges to a resonant frequency of the haptic transducer.

19 Claims, 4 Drawing Sheets

(51) Int. Cl.
*B06B 1/06* (2006.01)
*H02N 2/00* (2006.01)
*B06B 1/02* (2006.01)
*B06B 1/04* (2006.01)

(52) U.S. Cl.
CPC ............ *B06B 1/0688* (2013.01); *H02N 2/00* (2013.01); *B06B 1/045* (2013.01)

(56) References Cited

U.S. PATENT DOCUMENTS

| | | | |
|---|---|---|---|
| 6,050,393 | A | 4/2000 | Murai et al. |
| 6,388,520 | B2 | 5/2002 | Wada et al. |
| 6,580,796 | B1 | 6/2003 | Kuroki |
| 6,683,437 | B2 | 1/2004 | Tierling |
| 6,703,550 | B2 | 3/2004 | Chu |
| 6,762,745 | B1 | 7/2004 | Braun et al. |
| 6,906,697 | B2 | 6/2005 | Rosenberg |
| 6,995,747 | B2 | 2/2006 | Casebolt et al. |
| 7,154,470 | B2 | 12/2006 | Tierling |
| 7,623,114 | B2 | 11/2009 | Rank |
| 7,639,232 | B2 | 12/2009 | Grant et al. |
| 7,791,588 | B2 | 9/2010 | Tierling et al. |
| 7,979,146 | B2 | 7/2011 | Ulrich et al. |
| 8,068,025 | B2 | 11/2011 | Devenyi et al. |
| 8,098,234 | B2 | 1/2012 | Lacroix et al. |
| 8,102,364 | B2 | 1/2012 | Tierling |
| 8,325,144 | B1 | 12/2012 | Tierling et al. |
| 8,427,286 | B2 | 4/2013 | Grant et al. |
| 8,466,778 | B2 | 6/2013 | Hwang et al. |
| 8,572,293 | B2 | 10/2013 | Cruz-Hernandez et al. |
| 8,593,269 | B2 | 11/2013 | Grant et al. |
| 8,648,829 | B2 | 2/2014 | Shahoian et al. |
| 8,659,208 | B1 | 2/2014 | Rose et al. |
| 8,754,757 | B1 | 6/2014 | Ullrich et al. |
| 8,947,216 | B2 | 2/2015 | Da Costa et al. |
| 8,981,915 | B2 | 3/2015 | Birnbaum et al. |
| 8,994,518 | B2 | 3/2015 | Gregorio et al. |
| 9,030,428 | B2 | 5/2015 | Fleming |
| 9,063,570 | B2 | 6/2015 | Weddle et al. |
| 9,083,821 | B2 | 7/2015 | Hughes |
| 9,092,059 | B2 | 7/2015 | Bhatia |
| 9,117,347 | B2 | 8/2015 | Matthews |
| 9,128,523 | B2 | 9/2015 | Buuck et al. |
| 9,164,587 | B2 | 10/2015 | Da Costa et al. |
| 9,196,135 | B2 | 11/2015 | Shah et al. |
| 9,248,840 | B2 | 2/2016 | Truong |
| 9,329,721 | B1 | 5/2016 | Buuck et al. |
| 9,354,704 | B2 * | 5/2016 | Lacroix .................. G06F 3/016 |
| 9,368,005 | B2 | 6/2016 | Cruz-Hernandez et al. |
| 9,489,047 | B2 | 11/2016 | Jiang et al. |
| 9,507,423 | B2 * | 11/2016 | Gandhi .................. G08B 6/00 |
| 9,513,709 | B2 | 12/2016 | Gregorio et al. |
| 9,520,036 | B1 | 12/2016 | Buuck et al. |
| 9,588,586 | B2 | 3/2017 | Rihn |
| 9,640,047 | B2 | 5/2017 | Choi et al. |
| 9,652,041 | B2 | 5/2017 | Jiang et al. |
| 9,697,450 | B1 | 7/2017 | Lee |
| 9,740,381 | B1 | 8/2017 | Chaudhri et al. |
| 9,842,476 | B2 | 12/2017 | Rihn et al. |
| 9,864,567 | B2 | 1/2018 | Seo |
| 9,881,467 | B2 | 1/2018 | Levesque |
| 9,946,348 | B2 | 4/2018 | Saboune et al. |
| 9,959,744 | B2 | 5/2018 | Koskan et al. |
| 10,055,950 | B2 | 8/2018 | Bhatia et al. |
| 10,074,246 | B2 | 9/2018 | Da Costa et al. |
| 10,110,152 | B1 | 10/2018 | Hajati |
| 10,175,763 | B2 | 1/2019 | Shah |
| 10,620,704 | B2 | 4/2020 | Rand et al. |
| 2003/0068053 | A1 | 4/2003 | Chu |
| 2003/0214485 | A1 | 11/2003 | Roberts |
| 2006/0028095 | A1 | 2/2006 | Maruyama et al. |
| 2006/0284856 | A1 | 12/2006 | Soss |
| 2008/0167832 | A1 | 7/2008 | Soss |
| 2008/0293453 | A1 | 11/2008 | Atlas et al. |
| 2008/0316181 | A1 | 12/2008 | Nurmi |
| 2009/0079690 | A1 | 3/2009 | Watson et al. |
| 2009/0088220 | A1 | 4/2009 | Persson |
| 2009/0102805 | A1 | 4/2009 | Meijer et al. |
| 2009/0153499 | A1 | 6/2009 | Kim et al. |
| 2010/0141408 | A1 * | 6/2010 | Doy .................. G06F 3/016 340/407.2 |
| 2010/0141606 | A1 | 6/2010 | Bae et al. |
| 2011/0141052 | A1 | 6/2011 | Bernstein et al. |
| 2011/0167391 | A1 | 7/2011 | Momeyer et al. |
| 2012/0105358 | A1 | 5/2012 | Momeyer et al. |
| 2012/0229264 | A1 | 9/2012 | Company Bosch et al. |
| 2012/0306631 | A1 | 12/2012 | Hughes |
| 2013/0027359 | A1 | 1/2013 | Schevin et al. |
| 2013/0141382 | A1 | 6/2013 | Modarres et al. |
| 2013/0275058 | A1 | 10/2013 | Awad |
| 2013/0289994 | A1 | 10/2013 | Newman et al. |
| 2014/0056461 | A1 | 2/2014 | Afshar |
| 2014/0079248 | A1 | 3/2014 | Short et al. |
| 2014/0085064 | A1 | 3/2014 | Crawley et al. |
| 2014/0292501 | A1 | 10/2014 | Lim et al. |
| 2014/0340209 | A1 | 11/2014 | Lacroix et al. |
| 2015/0084752 | A1 | 3/2015 | Heubel et al. |
| 2015/0216762 | A1 | 8/2015 | Oohashi et al. |
| 2015/0324116 | A1 | 11/2015 | Marsden et al. |
| 2015/0325116 | A1 | 11/2015 | Simmons et al. |
| 2016/0074278 | A1 | 3/2016 | Muench et al. |
| 2016/0132118 | A1 | 5/2016 | Park et al. |
| 2016/0162031 | A1 | 6/2016 | Westerman et al. |
| 2016/0179203 | A1 | 6/2016 | Modarres et al. |
| 2016/0239089 | A1 | 8/2016 | Taninaka et al. |
| 2016/0246378 | A1 | 8/2016 | Sampanes et al. |
| 2016/0358605 | A1 | 12/2016 | Ganong, III et al. |
| 2017/0052593 | A1 | 2/2017 | Jiang et al. |
| 2017/0078804 | A1 | 3/2017 | Guo et al. |
| 2017/0153760 | A1 | 6/2017 | Chawda et al. |
| 2017/0256145 | A1 | 9/2017 | Macours et al. |
| 2017/0277350 | A1 | 9/2017 | Wang et al. |
| 2018/0021811 | A1 | 1/2018 | Kutej et al. |
| 2018/0059793 | A1 | 3/2018 | Hajati |
| 2018/0084362 | A1 | 3/2018 | Zhang et al. |
| 2018/0151036 | A1 * | 5/2018 | Cha .................. A63F 13/00 |
| 2018/0158289 | A1 * | 6/2018 | Vasilev .................. H02P 25/032 |
| 2018/0160227 | A1 | 6/2018 | Lawrence et al. |
| 2018/0178114 | A1 | 6/2018 | Mizuta et al. |
| 2018/0182212 | A1 | 6/2018 | Li et al. |
| 2018/0183372 | A1 | 6/2018 | Li et al. |
| 2018/0237033 | A1 | 8/2018 | Hakeem et al. |
| 2018/0253123 | A1 | 9/2018 | Levesque et al. |
| 2018/0294757 | A1 | 10/2018 | Feng et al. |
| 2018/0301060 | A1 | 10/2018 | Israr et al. |
| 2018/0321748 | A1 | 11/2018 | Rao et al. |
| 2018/0329172 | A1 | 11/2018 | Tabuchi |
| 2018/0367897 | A1 | 12/2018 | Bjork et al. |
| 2019/0227628 | A1 | 1/2019 | Rand et al. |
| 2019/0073078 | A1 | 3/2019 | Sheng et al. |
| 2019/0103829 | A1 * | 4/2019 | Vasudevan .............. G06F 3/016 |
| 2019/0138098 | A1 | 5/2019 | Shah |
| 2019/0206396 | A1 | 7/2019 | Chen |
| 2019/0114496 | A1 | 8/2019 | Lesso |
| 2019/0294247 | A1 | 9/2019 | Hu et al. |
| 2019/0296674 | A1 | 9/2019 | Janko et al. |
| 2019/0297418 | A1 | 9/2019 | Stahl |
| 2019/0341903 | A1 | 11/2019 | Kim |

FOREIGN PATENT DOCUMENTS

| | | |
|---|---|---|
| EP | 0784844 B1 | 6/2005 |
| EP | 2363785 A1 | 9/2011 |
| EP | 2600225 A1 | 6/2013 |
| EP | 2846218 A1 | 3/2015 |
| EP | 3379382 A1 | 9/2018 |
| IN | 201747044027 | 8/2018 |
| JP | H02130433 B2 | 5/1990 |
| JP | H08149006 A | 6/1996 |
| JP | 6026751 B2 | 11/2016 |
| JP | 6250985 | 12/2017 |
| JP | 6321351 | 5/2018 |
| KR | 20120126446 A | 11/2012 |

(56) References Cited

FOREIGN PATENT DOCUMENTS

| WO | 2013104919 A1 | 7/2013 |
| --- | --- | --- |
| WO | 2013186845 A1 | 12/2013 |
| WO | 2014018086 A1 | 1/2014 |
| WO | 2014094283 A1 | 6/2014 |
| WO | 2016105496 A1 | 6/2016 |
| WO | 2016164193 A1 | 10/2016 |
| WO | 2018053159 A1 | 3/2018 |
| WO | 2018067613 A1 | 4/2018 |
| WO | 2018125347 A1 | 7/2018 |

OTHER PUBLICATIONS

International Search Report and Written Opinion of the International Searching Authority, International Application No. PCT/GB2019/050964, dated Sep. 3, 2019.

Communication Relating to the Results of the Partial International Search, and Provisional Opinion Accompanying the Partial Search Result, of the International Searching Authority, International Application No. PCT/US2018/031329, dated Jul. 20, 2018.

Combined Search and Examination Report, UKIPO, Application No. GB1720424.9, dated Jun. 5, 2018.

International Search Report and Written Opinion of the International Searching Authority, International Application No. PCT/US2020/023342, dated Jun. 9, 2020.

International Search Report and Written Opinion of the International Searching Authority, International Application No. PCT/GB20201050823, dated Jun. 30, 2020.

International Search Report and Written Opinion of the International Searching Authority, International Application No. PCT/GB2020/051037, dated Jul. 9, 2020.

Communication Relating to the Results of the Partial International Search, and Provisional Opinion Accompanying the Partial Search Result, of the International Searching Authority, International Application No. PCT/GB2020/050822, dated Jul. 9, 2020.

International Search Report and Written Opinion of the International Searching Authority, International Application No. PCT/GB2020/051035, dated Jul. 10, 2020.

International Search Report and Written Opinion of the International Searching Authority, International Application No. PCT/US2020/024864, dated Jul. 6, 2020.

\* cited by examiner

METHODS AND APPARATUS FOR DRIVING A TRANSDUCER

TECHNICAL FIELD

Embodiments described herein relate to methods and apparatus for driving a transducer, for example a haptic transducer, at a resonant frequency of the transducer.

BACKGROUND

Vibro-haptic transducers, for example linear resonant actuators (LRAs), are widely used in portable devices such as mobile phones to generate vibrational feedback to a user. Vibro-haptic feedback in various forms creates different feelings of touch to a user's skin, and may play increasing roles in human-machine interactions for modern devices.

An LRA may be modelled as a mass-spring electro-mechanical vibration system. When driven with appropriately designed or controlled driving signals, an LRA may generate certain desired forms of vibrations. For example, a sharp and clear-cut vibration pattern on a user's finger may be used to create a sensation that mimics a mechanical button click. This clear-cut vibration may then be used as a virtual switch to replace mechanical buttons.

Figure 1:
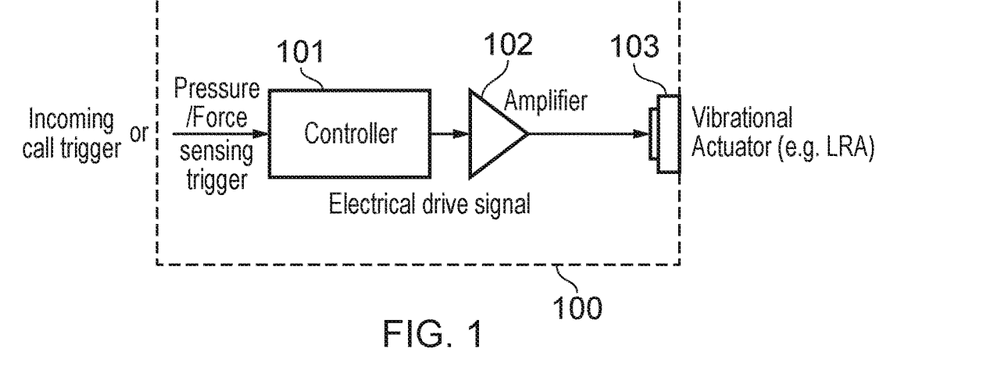
FIG. 1 illustrates an example of a vibro-haptic system in a device in accordance with the prior art.

FIG. 1 illustrates an example of a vibro-haptic system in a device 100. The device comprises a controller 101 configured to control a signal applied to an amplifier 102. The amplifier 102 then drives the haptic transducer 103 based on the signal. The controller 101 may be triggered by a trigger to output to the signal. The trigger may for example comprise a pressure or force sensor on a screen of the device 100.

Among the various forms of vibro-haptic feedback, tonal vibrations of sustained duration may play an important role to notify the user of the device of certain predefined events, such as incoming calls or messages, emergency alerts, and timer warnings etc. In order to generate tonal vibration notifications efficiently, it may be desirable to operate the haptic actuator at its resonance frequency.

The resonance frequency $f_0$ of a haptic transducer may be approximately estimated as:

$$f_0 = \frac{1}{2\pi\sqrt{CM}}, \quad (1)$$

where, C is the compliance of the spring system, and M is the equivalent moving mass, which may be determined based on both the actual moving part in the haptic transducer and the mass of the portable device holding the haptic transducer.

Due to sample-to-sample variations in individual haptic transducers, mobile device assembly variations, temporal component changes caused by aging, and use conditions such as various different strengths of a user gripping of the device, the vibration resonance of the haptic transducer may vary from time to time.

Figure 2:
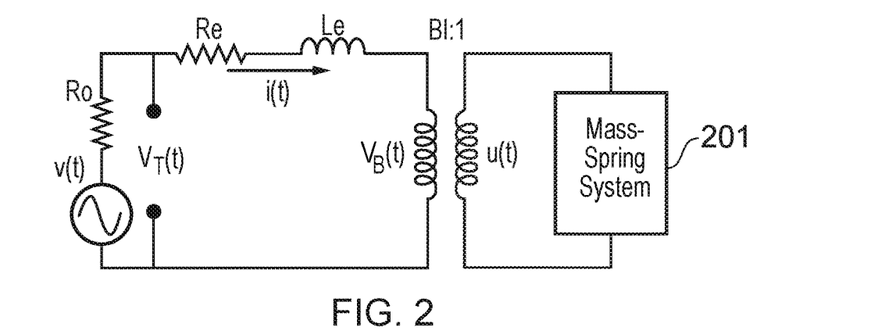
FIG. 2 illustrates an example of a Linear Resonant Actuator (LRA) modelled as a linear system in accordance with the prior art.

FIG. 2 illustrates an example of a Linear Resonant Actuator (LRA) modelled as a linear system. LRAs are non-linear components that may behave differently depending on, for example, the voltage levels applied, the operating temperature, and the frequency of operation. However, these components may be modelled as linear components within certain conditions. In this example, the LRA is modelled as a third order system having electrical and mechanical elements.

In particular, Re and Le are the DC resistance and coil inductance of the coil-magnet system, respectively; and Bl is the magnetic force factor of the coil. The driving amplifier outputs the voltage waveform V(t) with the output impedance Ro. The terminal voltage $V_T(t)$ may be sensed across the terminals of the haptic transducer. The mass-spring system 201 moves with velocity u(t).

SUMMARY

According to some embodiments, there is therefore provided a method for driving a haptic transducer with a driving signal. The method comprises estimating, based on a current through the haptic transducer and a terminal voltage across the haptic transducer, a back electromotive force, EMF, voltage representative of a velocity of a mass in the haptic transducer; comparing a phase of a voltage signal derived from the terminal voltage with a phase of the estimated back EMF voltage; and based on the comparison, adjusting a frequency and/or a phase of an output signal, wherein the driving signal is derived from the output signal, such that a frequency of the driving signal converges to a resonant frequency of the haptic transducer.

A resonant frequency tracker is provided for driving a haptic transducer with a driving signal, the resonance-frequency tracker comprising: a back electromotive force, EMF, modelling module configured to estimate, based on a current through the haptic transducer and a terminal voltage across the haptic transducer, a back-EMF voltage representative of a velocity of a mass in the haptic transducer; and a controlling circuitry configured to: receive a voltage signal derived from the terminal voltage; compare a phase of the voltage signal with a phase of the estimated back EMF voltage, and based on the comparison, adjust a frequency and/or a phase of an output signal output by the controller, wherein the driving signal is derived from the output of the controller, such that a frequency of the driving signal converges to a resonant frequency of the haptic transducer.

According to some embodiments, there is provided an electronic apparatus. The electronic apparatus comprises a haptic transducer; and a resonant frequency tracker comprising: a back electromotive force, EMF, modelling module configured to estimate, based on a current through the haptic transducer and a terminal voltage across the haptic transducer, a back-EMF voltage representative of a velocity of a mass in the haptic transducer; and a controller configured to: receive a voltage signal derived from the terminal voltage; compare a phase of the voltage signal with a phase of the estimated back EMF voltage, and based on the comparison, adjust a frequency and/or a phase of an output signal output by the controller, wherein the driving signal is derived from the output of the controller, such that a frequency of the driving signal converges to a resonant frequency of the haptic transducer.

BRIEF DESCRIPTION OF THE DRAWINGS

For a better understanding of the embodiments of the present disclosure, and to show how it may be put into effect, reference will now be made, by way of example only, to the accompanying drawings, in which.

DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiment discussed below, and all such equivalents should be deemed as being encompassed by the present disclosure.

Various electronic devices or smart devices may have transducers, speakers, any acoustic output transducers, for example any transducer for converting a suitable electrical driving signal into an acoustic output such as a sonic pressure wave or mechanical vibration. For example, many electronic devices may include one or more speakers or loudspeakers for sound generation, for example, for playback of audio content, voice communications and/or for providing audible notifications.

Such speakers or loudspeakers may comprise an electromagnetic actuator, for example a voice coil motor, which is mechanically coupled to a flexible diaphragm, for example a conventional loudspeaker cone, or which is mechanically coupled to a surface of a device, for example the glass screen of a mobile device. Some electronic devices may also include acoustic output transducers capable of generating ultrasonic waves, for example for use in proximity detection type applications and/or machine-to-machine communication.

Many electronic devices may additionally or alternatively include more specialized acoustic output transducers, for example, haptic transducers, tailored for generating vibrations for haptic control feedback or notifications to a user. Additionally or alternatively an electronic device may have a connector, e.g. a socket, for making a removable mating connection with a corresponding connector of an accessory apparatus and may be arranged to provide a driving signal to the connector so as to drive a transducer, of one or more of the types mentioned above, of the accessory apparatus when connected. Such an electronic device will thus comprise driving circuitry for driving the transducer of the host device or connected accessory with a suitable driving signal. For acoustic or haptic transducers, the driving signal will generally be an analog time varying voltage signal, for example, a time varying waveform.

As previously mentioned, driving a haptic transducer at resonance frequency may be useful for some types of haptic application.

Referring to FIG. 2, the back electromotive force (EMF) voltage, $V_B(t)$ of the haptic transducer is related to the velocity u(t) of the moving mass inside the haptic transducer by:

$$V_B(t) = Bl \cdot u(t). \tag{2}$$

Whether or not the driving signal V(t) is at the resonance frequency of the haptic transducer may be determined from a comparison between the back-EMF, $V_B(t)$ in the haptic transducer, and the terminal voltage, $V_T(t)$. For example, if the phase of $V_B(t)$ is lagging or leading the terminal voltage $V_T(t)$, the driving signal V(t) may be adjusted such that the phase of $V_B(t)$ is in line with the phase of $V_T(t)$. In general, the back EMF voltage $V_B(t)$ may not be directly measured from outside of the haptic transducer. However, the terminal voltage $V_T(t)$ measured at the terminals of the haptic transducer, may be related to $V_B(t)$ by:

$$V_T(t) = V_B(t) + \text{Re} \cdot I(t) + Le \cdot \frac{dI(t)}{dt}, \tag{3}$$

where the parameters are defined as described with reference to FIG. 2.

The haptic transducer terminal voltage itself may only therefore approximate the back-EMF voltage $V_B(t)$ at times when the current I(t) has levels that are very close to zero, and when the driving voltage V(t) is also close to zero. In other words:

$$V_T(t) \approx V_B(t) \tag{4}$$

when $$V(t) \to 0, \text{ and} \tag{5}$$

$$I(t) \to 0. \tag{6}$$

From FIG. 2, it may also be seen that:

$$V_T(t) = V(t) - Ro \cdot I(t), \tag{7}$$

which further implies that, even at zero-crossings of the driving voltage V(t), the usually very small playback output impedance Ro of the amplifier may be short-circuiting the terminal and making the level of measurable terminal voltage $V_T(t)$ too low to be sensed accurately, as shown by:

$$V_B(t) \approx V_T(t) = V(t) - Ro \cdot I(t) \to 0, \text{ if } Ro << 1. \tag{8}$$

This difficulty in sensing the terminal voltage $V_T(t)$ close to zero-crossings means that the amplifier may need to be switched into a high impedance mode Ro→0 quickly during zero-crossings of the driving signal; otherwise, the level of terminal voltage $V_T(t) \approx V_B(t)$ may be too low to be sensed with acceptable accuracy.

Measuring the back-EMF voltage $V_B(t)$ across the terminals of the haptic transducer may therefore only allow for sensing of the back-EMF voltage $V_B(t)$ during zero-crossings of the terminal voltage. Furthermore, it may require extra amplifier hardware designs that switch the driving amplifier into a high-impedance mode during the zero-crossings, in order for the back-EMF voltage to be sensed with appropriate accuracy, because the voltage level across the terminals of the haptic transducer may be reduced if the impedance of the amplifier is not high enough.

Figure 3:
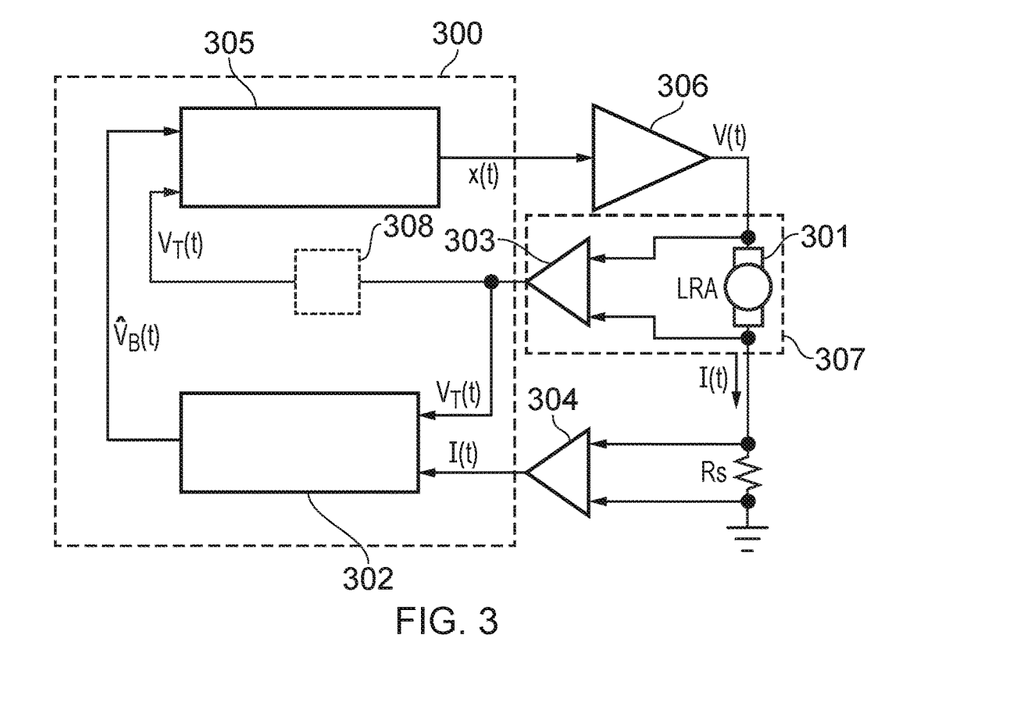
FIG. 3 illustrates an example of a resonant frequency tracker for driving a haptic transducer with a driving signal in accordance with some embodiments of the present disclosure.

FIG. 3 illustrates an example resonant frequency tracker 300 for driving a haptic transducer 301 with a driving signal V(t) in accordance with some embodiments.

The resonance-frequency tracker 300 comprises a back electromotive force, EMF, modelling module 302 configured to estimate, based on a current through the haptic transducer, I(t) and a terminal voltage $V_T(t)$ across the haptic transducer 301, a back-EMF voltage $\widehat{V_B}(t)$ representative of a velocity of a mass in the haptic transducer 301. For example, the back-EMF voltage may be modelled according to equation (3) which may be rearranged as:

$$V_B(t) = V_T(t) - \text{Re} \cdot I(t) - Le \frac{dI(t)}{dt}. \tag{9}$$

A further example of how the back-EMF may be modelled based on the current, I(t) and a terminal voltage $V_T(t)$, is described with reference to FIG. 5 below.

In this example, the sensed terminal voltage $V_T(t)$ is first converted to a digital representation by a first analog-to-digital converter (ADC) 303. Similarly, in this example, the sensed current I(t) is converted to a digital representation by a second ADC 304. The current I(t) may be sensed across a shunt resistor Rs coupled to a terminal of the haptic transducer 301. The terminal voltage $V_T(t)$ may be sensed by a terminal voltage sensing block 307, for example a volt meter.

The resonance-frequency tracker 300 further comprises a controller 305 configured to receive a voltage signal $\widehat{V_T}(t)$ derived from the terminal voltage $V_T(t)$. In some examples, the voltage signal $\widehat{V_T}(t)$ comprises a processed version of the terminal voltage $V_T(t)$, wherein the terminal voltage $V_T(t)$ is processed by processing block 308. In some examples, the voltage signal $\widehat{V_T}(t)$ comprises the terminal voltage, $V_T(t)$.

The controller 305 may be configured to compare a phase of the voltage signal, $\widehat{V_T}(t)$ with a phase of the estimated back EMF voltage $\widehat{V_B}(t)$, and, based on the comparison, adjust a frequency and/or a phase of an output signal, x(t) output by the controller. The driving signal, V(t) may then be derived from the output signal x(t) of the controller 305, such that a frequency of the driving signal V(t) converges to a resonant frequency of the haptic transducer 301.

For example, the output signal x(t) output by the controller 305 may be amplified by amplifier 306 to generate the driving signal V(t).

For example, the controller 305 may comprise a feedback controller, for example a phase locked loop. The phase-locked loop may therefore be configured to alter the frequency and/or phase of the output signal x(t) in order to lock the phase of the voltage signal $\widehat{V_B}(t)$ across the haptic transducer to the estimated back EMF voltage $\widehat{V_T}(t)$ in the haptic transducer 301. By locking the phase of the voltage signal $\widehat{V_B}(t)$ to the estimated back EMF voltage $\widehat{V_B}(t)$, the frequency of the driving signal V(t) will converge to a resonant frequency of the haptic transducer 301.

Figure 4:
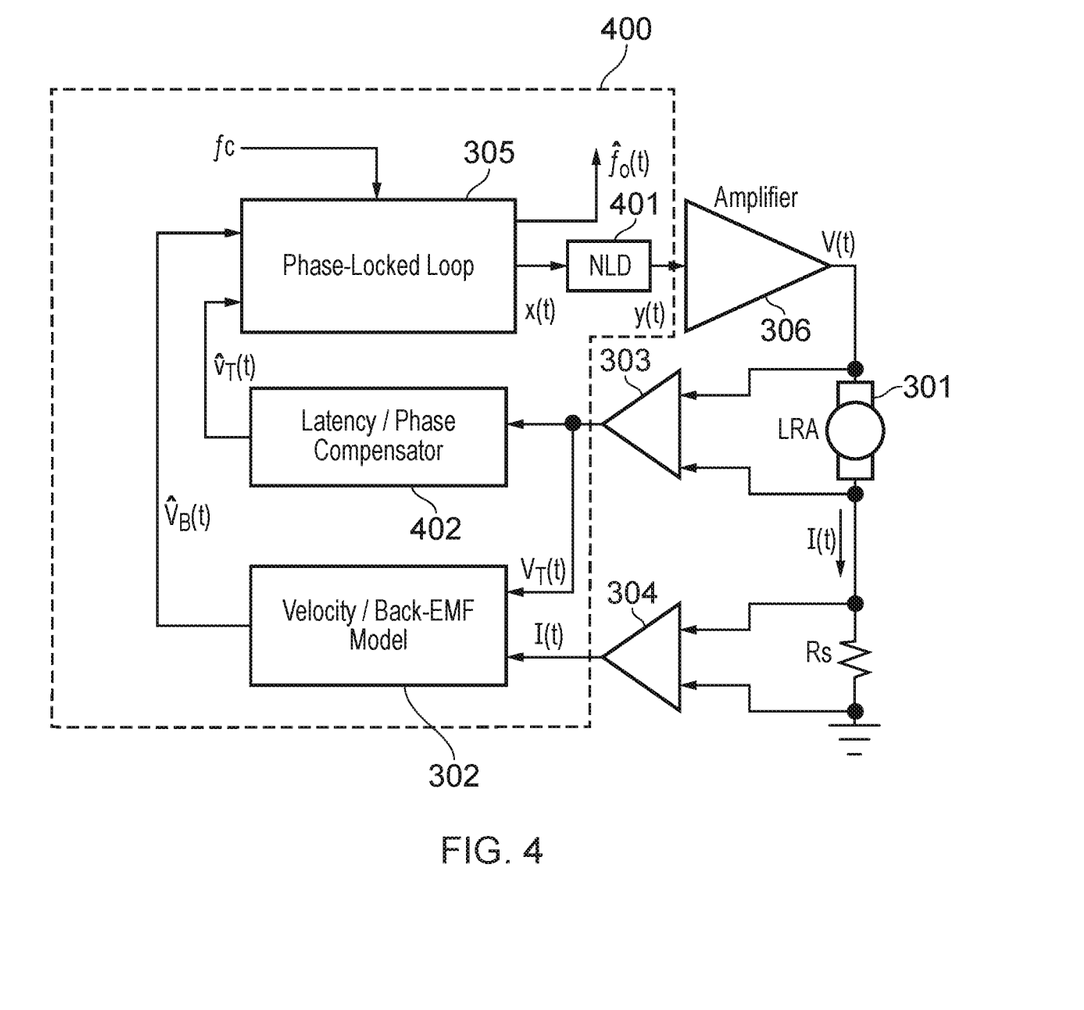
FIG. 4 illustrates an example of a resonant frequency tracker for driving a haptic transducer with a driving signal in accordance with some embodiments of the present disclosure.

FIG. 4 illustrates a resonant frequency tracker 400 for driving a haptic transducer 301 with a driving signal V(t) in accordance with some embodiments. Similar features in FIG. 4 are given the same reference numbers as in FIG. 3.

In this example, the controller 305 comprises a phase locked loop (PLL) 305. The PLL uses the estimated back EMF voltage $\widehat{V_T}(t)$ as a reference signal. The frequency of the output signal x(t) is adjusted according to the phase different information between $\widehat{V_B}(t)$ and $\widehat{V_T}(t)$.

The PLL 305 may also estimate the frequency $\hat{f}_0(t)$ of the reference signal. The PLL 305 may comprise a voltage-controlled oscillator (VCO), or a digital controlled oscillator (DCO), which may be configured as a sinusoidal signal generator. The VCO or DCO may commence oscillation at around a quiescent frequency $f_C$. The instantaneous phase and frequency of the output signal x(t) may then be adapted according to a filtered and/or smoothed phase difference between the input reference signal $\widehat{V_B}(t)$ and the voltage signal $\widehat{V_T}(t)$. For example, if the phase of the voltage signal $\widehat{V_T}(t)$ is leading the reference signal $\widehat{V_B}(t)$, then the phase increment of the output signal x(t) may be decreased to make the terminal voltage oscillate slower. Furthermore, if the phase of the voltage signal $\widehat{V_T}(t)$ is lagging the estimated back-EMF, then the phase increment of the output signal x(t) may be increased so that the voltage signal $\widehat{V_T}(t)$ oscillates faster.

This control operation may allow the frequency of the terminal voltage converge and the frequency of the driving signal derived from the output signal x(t), to converge to the resonant frequency of the back-EMF $V_{\hat{B}}(t)$ in the transducer.

In this example, the sinusoidal signal x(t) generated by the PLL 305 is processed by a non-linear device (NLD) 401 to achieve waveform shaping effects. For example, it may be desirable for the shape of the waveform to be closer to a square wave for haptic applications. The output y(t) of the NLD 401 may then be amplified by amplifier 306 to generate the driving signal V(t).

In other words, the NLD 401 is coupled to receive the output signal x(t), wherein the NLD 401 shapes a waveform of the output signal x(t) to control a shape of the driving signal V(t) for driving the haptic transducer 301.

The driving signal V(t) may therefore converge to the resonant frequency of the transducer 301 to make sustained tonal notification or feedback to the user at the resonant frequency of the transducer 301.

The back EMF modelling module 302 may be configured to estimate the back EMF voltage $\widehat{V_B}(t)$ continuously, which may enable continuous phase comparison between the back-EMF $\widehat{V_B}(t)$ and the voltage signal $\widehat{V_T}(t)$, and therefore a continuous adjustment procedure in the PLL 305. By modelling the back-EMF based on the current I(t) and terminal voltage $V_T(t)$ across the transducer 301, the need for amplifier impedance mode switches may be avoided. This modelling may reduce the hardware complexity and the sizes of the integrated circuitry for the amplifier, as no further hardware is required to implement a high impedance mode for the amplifier 306. The removal of impedance mode switching may also eliminate any impulsive noise caused by such mode switching.

The back-EMF modelling module 302 may be adaptive. However, in this example, it is appreciated that the back-EMF modelling module 302 may introduce some delay and may provide a delayed estimate of the back-EMF voltage $\widehat{V_B}(t)$. Furthermore, depending on the implementation of the back-EMF modelling module 302, there may be latency and/or phase distortion between the terminal voltage $V_T(t)$ sensed across the transducer 301, and the back-EMF voltage $\widehat{V_B}(t)$. The resonant frequency tracker 400 may therefore further comprise a compensator module 402 coupled and configured to delay the terminal voltage $V_T(t)$ to generate the voltage signal $\widehat{V_T}(t)$. The delay applied by the compensator module 402 may be configured to equate to the delay caused by the back-EMF modelling module 302.

Figure 5:
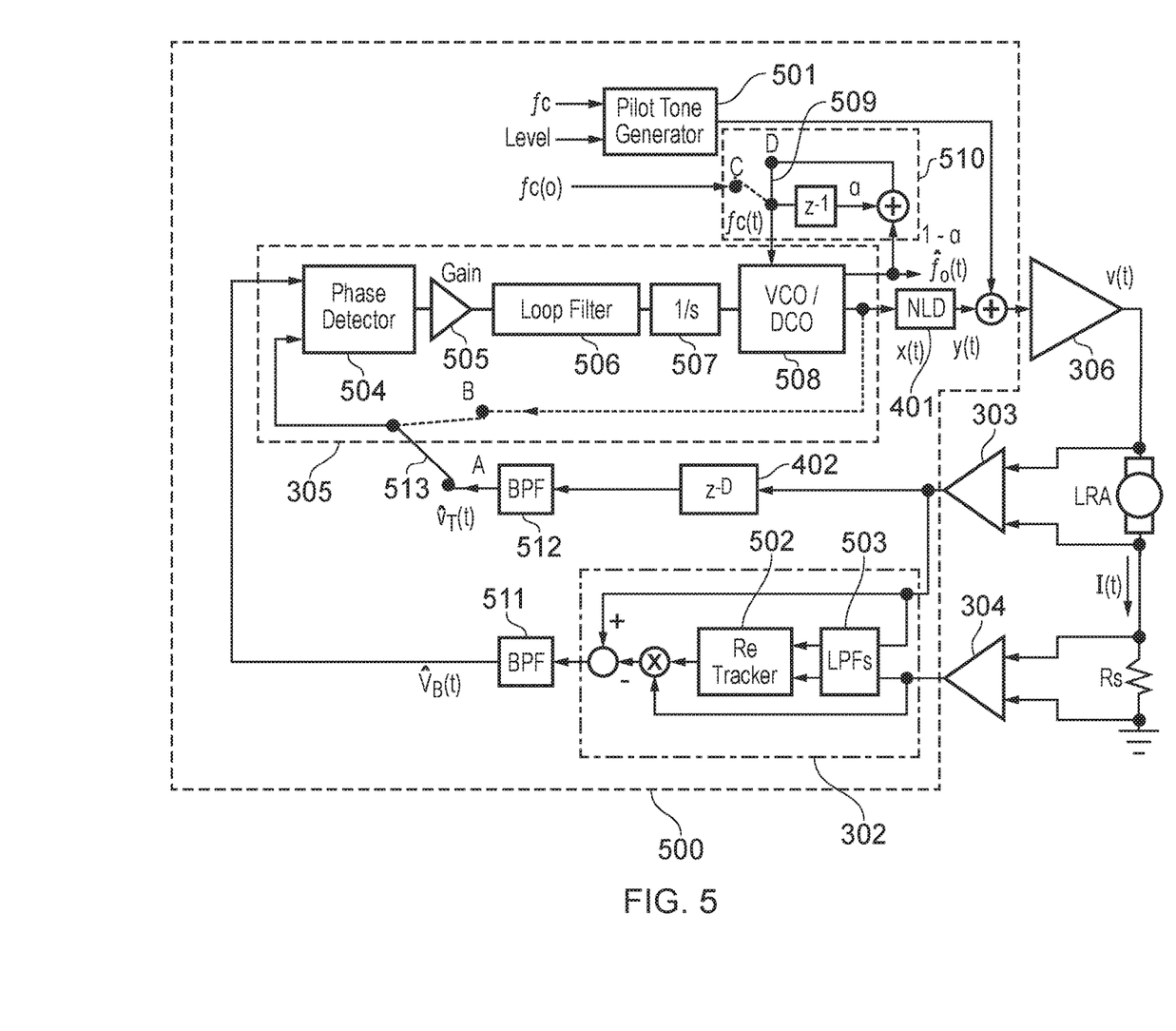
FIG. 5 illustrates an example of a resonant frequency tracker for driving a haptic transducer with a driving signal in accordance with some embodiments of the present disclosure.

FIG. 5 illustrates an implementation of a resonant frequency tracker 500 according to some embodiments. Similar features have been given similar reference numbers to those in FIG. 4.

In this example, the resonant frequency tracker 500 comprises a pilot tone generator 501. The pilot tone generator 501 is coupled to the output of the controller 305. The pilot tone generator 501 may be configured to add a low frequency pilot tone to the output signal x(t) such that the driving signal V(t) comprises the low frequency pilot tone.

In this example, the pilot tone generator is coupled to the output of the controller via the NLD 401. In this example, therefore the pilot tone generator 501 is configured to add a low frequency pilot tone to the signal y(t) such that the driving signal V(t) comprises the low frequency pilot tone.

The frequency of the pilot tone is set to be low so that the pilot tone does not interfere with the driving signal to the transducer. For example, the frequency of the pilot tone may be less than 50 Hz. In other words, the frequency of the pilot tone may be selected such that it is out of the sensitivity range of human vibro-haptic perception (for example, out of the 100 Hz to 300 Hz frequency band). The pilot tone may improve the accuracy of the back-EMF voltage $\widehat{V_B}(t)$ as will be described below.

As described previously, the back-EMF voltage $\widehat{V_B}(t)$ may be modelled as described in equation (9). However, assuming the resonant frequency of the transducer 301 is low, the inductor of the coil may be neglected. This assumption leaves an estimation of the back-EMF voltage $\widehat{V_B}(t)$ as:

$$\widehat{V_B}(t) \approx V_T(t) - Re \cdot I(t), \quad (10)$$

Equation (10) may therefore provide an adaptive estimate of the back-EMF voltage $\widehat{V_B}(t)$ based on the terminal voltage $V_T(t)$ and the current I(t) without having to track the change in I(t) over time. Equation (10) therefore provides a real-time estimate of the back-EMF voltage $\widehat{V_B}(t)$.

An estimate of the DC-Resistance Re of the coil may therefore determine the quality and/or accuracy of the estimated back-EMF voltage $\widehat{V_B}(t)$.

The value of the DC-Resistance Re of the coil may vary as a function of the coil temperature, which may be affected by not only the thermal energy transferred by the driving signal, but also the environmental temperature. To track the DC-Resistance Re parameter, the pilot tone may therefore be used. By injecting the pilot tone, comprising a small amount of energy, at a frequency very close to the direct current (DC) band, the conditions for tracking the DC-resistance may be improved.

In this example, the back-EMF modelling module 302 comprises a DC-resistance tracker 502. The DC-resistance tracker 502 receives the terminal voltage and current across the transducer at the pilot tone frequency, i.e. $V_T^{LP}(t)$ and $I^{LP}(t)$, which are extracted from the sensed terminal voltage $V_T(t)$ and sensed current I(t) by a low pass filter 503 configured to filter at around the pilot tone frequency.

The DC-resistance tracker 502 may then calculate the DC-resistance as:

$$Re(t) = \frac{|V_T^{LP}(t)|}{|I^{LP}(t)| + \mu}, \quad (11)$$

where μ may be included as a small positive number to prevent division by zero.

In some examples, smoothing of the DC-resistance may be performed. For example, by:

$$Re = \gamma Re + (1-\gamma)Re(t), \quad (12)$$

where γ is a factor (0<<γ<1) for smoothing the instantaneous estimate Re(t).

The back-EMF modelling module 302 may then multiply the output of the DC-resistance tracker 502 by the sensed current I(t) and may subtract the result from the sensed terminal voltage $V_T(t)$, giving an estimate of the back-EMF voltage $\widehat{V_B}(t)$ according to equation (10).

In this example, the PLL 305 comprises a phase detector 504, an amplifier 505 configured to amplify the output of the phase detector, a low pass loop filter 506 and an integrating smoother 507 configured to filter and smooth the output of the amplifier 505. A VCO or DCO 508 may then generate the instantaneous frequency $\hat{f}_0(t)$ based on the filtered and smoothed phase difference. In some examples, the PLL 305 may commence tracking of the resonance frequency with switch 513 in position B. In this position, the PLL compares the estimated back-EMF voltage $\widehat{V_B}(t)$ to the output of the VCO or DCO 508. On initialization of the resonance frequency tracker 500, the output of the VCO or DCO 508 may be equal to an average or nominal resonance frequency of the transducer. After, for example, a single sample period, the switch may be moved to position A to receive the voltage signal $\widehat{V_T}(t)$.

The VCO or DCO 508 may start from a quiescent or center frequency $f_C$. The PLL 305 may be configured to set an initial value of the quiescent or center frequency to be a predetermined value $F_0$ associated with a haptic transducer. For example, $F_0$ may be an average or nominal resonance frequency of the transducer. In some examples, as illustrated in FIG. 4, the quiescent frequency may be set as a constant value. For example:

$$f_C = F_0. \quad (13)$$

In some examples, the nominal resonant frequency of a batch of transducers may be obtained from a specification of the transducer component provided by a manufacture of the transducer component, or the nominal resonant frequency may be derived from measurements of test samples in a particular batch.

As the control of the PLL 305 converges, the instantaneous frequency of the output signal x(t) will converge to the resonance frequency $f_0$ of the transducer 301. In other words:

$$f(t) = \hat{f}_0(t) \to f_0, \quad (14)$$

From equation (1), it can be observed that variations in resonance frequency from transducer to transducer depend on variations in the spring compliance C and the equivalent moving mass M, both of which may be likely to change throughout the lifetime of a transducer. Sample-to-sample variations, aging and device playback conditions are all potential causes of such changes. The variations in resonant frequency may in some examples be quite large, which may require the PLL 305 to track such a large frequency variation from the nominal frequency $F_0$ quite quickly.

To enable fast frequency acquisition, the quiescent frequency may be adapted according to information obtained from the instantaneously estimated resonance frequency $\hat{f}_0(t)$. For example, instead of selecting a constant quiescent frequency, as illustrated in FIG. 4, and in equation (13), an adaptively smoothed average may be performed for the adaptation of the quiescent or center frequency. For example, the following averaging procedure may be applied:

$$f_C(t) = \alpha f_c(t-1) + (1-\alpha) \hat{f}_0(t). \quad (15)$$

where α (0<<α<1) is the smoothing factor.

For example, utilizing the switch 509 between positions C and D, the PLL may start the resonance frequency tracking with the switch 509 in position C, setting the initial value of $f_C(t)$ to the nominal value of $F_0$. In other words:

$$f_C(0) = F_0. \quad (16)$$

After a single sample period has passed, the switch may change to position D. In this position, the adaptation block 510 may dynamically adapt the quiescent frequency $f_C(t)$ according to equation (15).

In some examples, to avoid potential abrupt errors in frequency acquisition, the adaptive quiescent or center frequency may be bounded to be within a predetermined frequency range that represents an expected range of the resonant frequency of the haptic transducer.

For example:

$$f_C(t) = f_C^L, \text{ if } f_C(t) < f_C^L, \quad (17)$$

and $$f_C(t) = f_C^H, \text{ if } f_C(t) > f_C^H. \quad (18)$$

The predetermined frequency range [$f_C^L$, $f_C^H$] may approximately cover a maximum expected variation of resonant frequency of the transducer 301.

In the example illustrated in FIG. 5, the resonance frequency tracker 500 further comprises two band pass filters. A first band pass filter 511 is coupled to receive the output of the back-EMF modelling module 302. A second band pass filter 512 is coupled to receive the output of the compensator module 402.

The first band pass filter 511 may be configured to filter the output of the back-EMF modelling module 302 to remove pilot-tone interferences, errors from the estimated back-EMF voltage which may be caused by measurement noises in the sensed terminal voltage $V_T(t)$ and current I(t), and errors from the estimated back-EMF voltage $\widehat{V_B}(t)$ caused by modelling inaccuracies in high frequency bands where the effects of coil inductances are non-negligible, in other words where equation (10) may not be valid.

Furthermore, the NLD 401 may introduce high order harmonic components above the fundamental frequency region, which again may be removed by the first band pass filter 511.

To reduce the potential effects mentioned above and to enable more accurate resonance tracking by the PLL 305, the second band pass filter 512 may filter the voltage signal $\widehat{V_T}(t)$. In particular the second band pass filter 512 may provide the same filtering as the first band pass filter 511. The second band pass filter 512 may therefore remove pilot-tone interferences and noise caused by sensing the terminal voltage $V_T(t)$. By utilizing the same filtering in both the first band pass filter 511 and the second band pass filter 512, phase or latency mismatch between the voltage signal $\widehat{V_T}(t)$ and the estimated back-EMF voltage $\widehat{V_B}(t)$, which may cause errors in phase detection and degrade the performance of the PLL 305, may be avoided.

The first band pass filter 511 and the second band pass filter 512 may be provided with a low cut off frequency voltage $f_L$ and a high cut off frequency $f_H$.

The low cut off frequency $f_L$ may be larger than the pilot tone frequency $f_P$, and larger than a sensitivity lower bound for human haptic perception, $f_{hp}^L$.

The high cut off frequency $f_H$ may be higher than the sensitivity upper bound for human haptic perception $f_{hp}^L$, but lower than the frequency at which coil inductance may start to have an effect $f_{Le}$.

It will be appreciated that resonant frequency tracker 300, 400 or 500 illustrated in FIG. 3, 4 or 5 may be implemented on an integrated circuit forming part of an electronic apparatus. For example, the electronic apparatus may comprise a haptic transducer 301 coupled to receive a driving signal from an amplifier 306, as illustrated in FIGS. 3, 4 and 5. The integrated circuit comprising the resonant frequency tracker 300, 400 or 500 may then control the driving signal as described with reference to any one of FIG. 3, 4 or 5.

The electronic apparatus may comprise is at least one among: a portable device; a battery power device; a computing device; a communications device; a gaming device; a mobile telephone; a personal media player; a laptop, tablet or notebook computing device.

Figure 6:
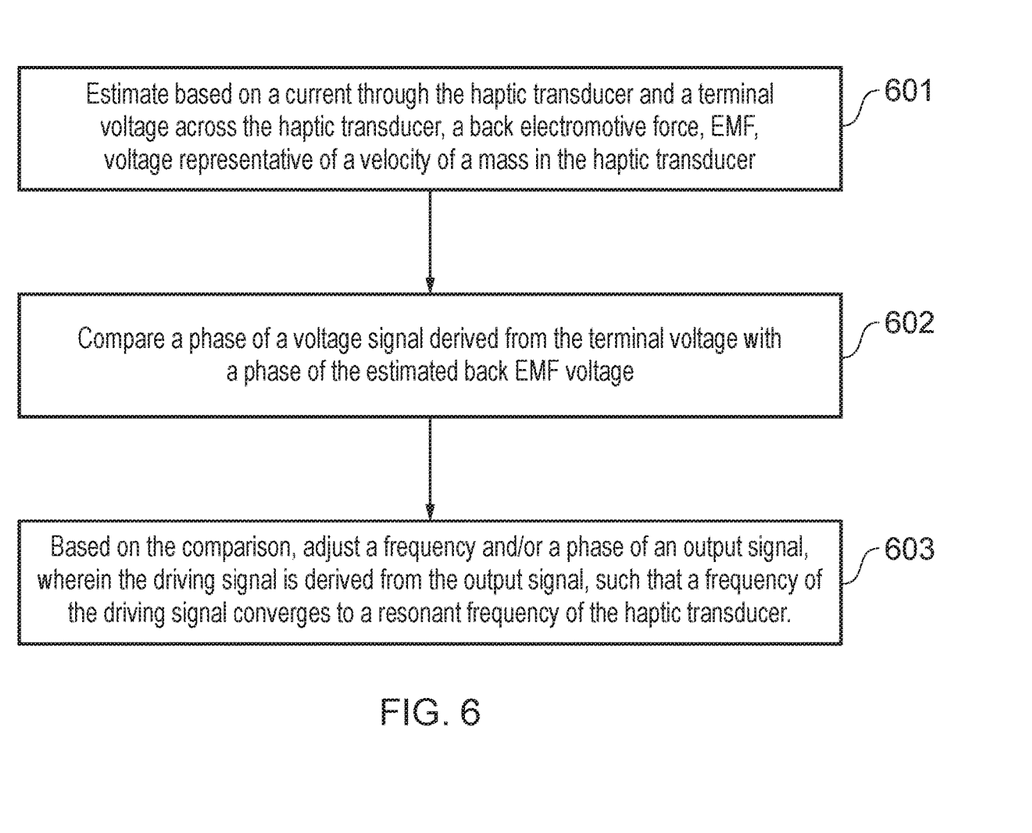
FIG. 6 is a flowchart illustrating a method for driving a haptic transducer with a driving signal in accordance with some embodiments of the present disclosure.

FIG. 6 illustrates a method for driving a haptic transducer with a driving signal. The method may be performed by a resonance frequency tracked as illustrated in any one of FIG. 3, 4 or 5.

In step 601, the method comprises estimating, based on a current through the haptic transducer and a terminal voltage across the haptic transducer, a back electromotive force, EMF, voltage representative of a velocity of a mass in the haptic transducer.

In step 602, the method comprises comparing a phase of a voltage signal derived from the terminal voltage with a phase of the estimated back EMF voltage.

In step 603, the method comprises based on the comparison, adjusting a frequency and/or a phase of an output signal, wherein the driving signal is derived from the output signal, such that a frequency of the driving signal converges to a resonant frequency of the haptic transducer.

Methods and apparatus are provided for tracking a resonant frequency of a transducer, for example a haptic transducer. In particular, an estimate of the back-EMF voltage across the transducer may be made based on a terminal voltage and current through the transducer. This back-EMF voltage may then be used to adjust the driving signal, such that a frequency of the driving signal converges to a resonant frequency of the transducer.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in the claim, "a" or "an" does not exclude a plurality, and a single feature or other unit may fulfill the functions of several units recited in the claims. Any reference numerals or labels in the claims shall not be construed so as to limit their scope. Terms such as amplify or gain may comprise applying a scaling factor of less than unity to a signal.

It will of course be appreciated that various embodiments of the analog conditioning circuit as described above or various blocks or parts thereof may be co-integrated with other blocks or parts thereof or with other functions of a host device on an integrated circuit such as a Smart Codec.

The skilled person will thus recognize that some aspects of the above-described apparatus and methods may be embodied as processor control code, for example on a non-volatile carrier medium such as a disk, CD- or DVD- ROM, programmed memory such as read only memory (Firmware), or on a data carrier such as an optical or electrical signal carrier. For many applications embodiments of the invention will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be understood—especially by those having ordinary skill in the art with the benefit of this disclosure—that the various operations described herein, particularly in connection with the figures, may be implemented by other circuitry or other hardware components. The order in which each operation of a given method is performed may be changed, and various elements of the systems illustrated herein may be added, reordered, combined, omitted, modified, etc. It is intended that this disclosure embrace all such modifications and changes and, accordingly, the above description should be regarded in an illustrative rather than a restrictive sense.

Similarly, although this disclosure makes reference to specific embodiments, certain modifications and changes can be made to those embodiments without departing from the scope and coverage of this disclosure. Moreover, any benefits, advantages, or solution to problems that are described herein with regard to specific embodiments are not intended to be construed as a critical, required, or essential feature of element.

Further embodiments likewise, with the benefit of this disclosure, will be apparent to those having ordinary skill in the art, and such embodiments should be deemed as being encompasses herein.

The invention claimed is:

1. A method for driving a haptic transducer with a driving signal, the method comprising:
   estimating, based on a current through the haptic transducer and a terminal voltage across the haptic transducer, a back electromotive force, EMF, voltage representative of a velocity of a mass in the haptic transducer;
   comparing a phase of a voltage signal derived from the terminal voltage with a phase of the estimated back EMF voltage; and
   based on the comparison, adjusting a frequency or a phase of an output signal, wherein the driving signal is derived from the output signal, such that a frequency of the driving signal converges to a resonant frequency of the haptic transducer.

2. The method of claim 1 wherein the step of adjusting comprises utilizing a phase locked loop to converge the frequency of the output signal to the resonance frequency of the estimated back EMF voltage.

3. The method of claim 2 wherein, the step of adjusting comprises adjusting the frequency of the output signal around a quiescent or a center frequency by:
   setting an initial value of the quiescent or center frequency to be a predetermined value associated with the haptic transducer, and
   adapting the quiescent or center frequency according to a smoothed instantaneous frequency of the driving signal.

4. The method of claim 3 wherein the adaptive quiescent or center frequency is bounded to be within a predetermined frequency range that represents an expected range of the resonant frequency of the haptic transducer.

5. The method of claim 1 further comprising:
   sensing the terminal voltage; and
   delaying the terminal voltage to generate the voltage signal.

6. The method of claim 1 further comprising:
   shaping a waveform of the output signal to control a shape of the driving signal for driving the haptic transducer.

7. The method of claim 1 further comprising:
   adding a low frequency pilot tone to the output signal, such that the driving signal comprises the low frequency pilot tone.

8. A resonant frequency tracker for driving a haptic transducer with a driving signal, the resonance-frequency tracker comprising:
   a back electromotive force, EMF, modelling module configured to estimate, based on a current through the haptic transducer and a terminal voltage across the haptic transducer, a back-EMF voltage representative of a velocity of a mass in the haptic transducer; and
   a controller configured to:
      receive a voltage signal derived from the terminal voltage;
      compare a phase of the voltage signal with a phase of the estimated back EMF voltage, and
      based on the comparison, adjust a frequency or a phase of an output signal output by the controller, wherein the driving signal is derived from the output of the controller, such that a frequency of the driving signal converges to a resonant frequency of the haptic transducer.

9. The resonant frequency tracker of claim 8 wherein the controller comprises a phase locked loop, PLL, module configured to converge the frequency of the output signal to the resonance frequency of the estimated back EMF voltage.

10. The resonant frequency tracker of claim 9 wherein the PLL module is configured to determine the frequency of the driving signal.

11. The resonant frequency tracker of claim 9 wherein the PLL module adjusts the frequency of the output of the controller around a quiescent or a center frequency, wherein the PLL module is configured to:
   set an initial value of the quiescent or center frequency to be a predetermined value associated with the haptic transducer, and
   adapt the quiescent or center frequency according to a smoothed instantaneous frequency of the driving signal.

12. The resonant frequency tracker of claim 11 wherein the adaptive quiescent or center frequency is bounded to be within a predetermined frequency range that represents an expected range of the resonant frequency of the haptic transducer.

13. The resonant frequency tracker of claim 8, further comprising:
   a terminal voltage sensing block configured to sense the terminal voltage; and
   a compensator module coupled and configured to delay the terminal voltage to generate the voltage signal.

14. The resonant frequency tracker of claim 8, further comprising a nonlinear device coupled to receive the output signal, wherein the nonlinear device shapes a waveform of the output signal to control a shape of the driving signal for driving the haptic transducer.

15. The resonant frequency tracker of claim 8, further comprising:
a pilot tone generator coupled to the output of the controller, wherein the pilot tone generator adds a low frequency pilot tone to the output signal such that the driving signal comprises the low frequency pilot tone.

16. The resonant frequency tracker of claim 8 further comprising:
a first band-pass filter configured to filter the estimated back EMF and to input the filtered estimated back EMF into the controller.

17. The resonant frequency tracker of claim 16 further comprising:
a second band-pass filter configured to filter the terminal voltage or a delayed terminal voltage, to generate the voltage signal, wherein the second band-pass filter matches the first band-pass filter.

18. An electronic apparatus comprising:
a haptic transducer; and
a resonant frequency tracker comprising:
a back electromotive force, EMF, modelling module configured to estimate, based on a current through the haptic transducer and a terminal voltage across the haptic transducer, a back-EMF voltage representative of a velocity of a mass in the haptic transducer; and
a controller configured to:
receive a voltage signal derived from the terminal voltage;
compare a phase of the voltage signal with a phase of the estimated back EMF voltage, and
based on the comparison, adjust a frequency or a phase of an output signal output by the controller, wherein the driving signal is derived from the output of the controller, such that a frequency of the driving signal converges to a resonant frequency of the haptic transducer.

19. An electronic apparatus as claimed in claim 18 wherein said electronic apparatus is at least one among: a portable device; a battery power device; a computing device; a communications device; a gaming device; a mobile telephone; a personal media player; a laptop, tablet or notebook computing device.

* * * * *

UNITED STATES PATENT AND TRADEMARK OFFICE
CERTIFICATE OF CORRECTION

| | | |
|---|---|---|
| PATENT NO. | : 10,795,443 B2 | Page 1 of 1 |
| APPLICATION NO. | : 16/207547 | |
| DATED | : October 6, 2020 | |
| INVENTOR(S) | : Hu et al. | |

It is certified that error appears in the above-identified patent and that said Letters Patent is hereby corrected as shown below:

On the Title Page

1. In Item (72), under "Inventors", in Column 1, Line 2, delete "Austin, TX (US)" and insert -- Shanghai, (CN) --, therefor.

In the Specification

2. In Column 5, Line 54, delete "$\widehat{V_B}(t)$," and insert --$\widehat{V_T}(t)$--, therefor.

3. In Column 5, Line 55, delete "$\widehat{V_T}(t)$," and insert --$\widehat{V_B}(t)$--, therefor.

4. In Column 5, Line 57, delete "$\widehat{V_B}(t)$," and insert --$\widehat{V_T}(t)$--, therefor.

5. In Column 5, Line 66, delete "$\widehat{V_T}(t)$," and insert --$\widehat{V_B}(t)$--, therefor.

6. In Column 6, Line 2, delete "$\widehat{V_B}(t)$ and $\widehat{V_T}(t)$." and insert --$\widehat{V_T}(t)$ and $\widehat{V_B}(t)$.--, therefor.

Signed and Sealed this
Twenty-fourth Day of October, 2023

Katherine Kelly Vidal
*Director of the United States Patent and Trademark Office*